(12) United States Patent
Golparian

(10) Patent No.: US 7,768,931 B2
(45) Date of Patent: Aug. 3, 2010

(54) HARDWARE-BASED NETWORK PACKET TIMESTAMPS: IMPROVED NETWORK CLOCK SYNCHRONIZATION

(75) Inventor: Daniel Golparian, Oslo (NO)

(73) Assignee: WesternGeco L.L.C., Houston, TX (US)

( * ) Notice: Subject to any disclaimer, the term of this patent is extended or adjusted under 35 U.S.C. 154(b) by 1700 days.

(21) Appl. No.: 10/960,340

(22) Filed: Oct. 7, 2004

(65) Prior Publication Data

US 2006/0080575 A1   Apr. 13, 2006

(51) Int. Cl.
*H04L 12/26* (2006.01)
*H04J 3/06* (2006.01)

(52) U.S. Cl. .................. 370/252; 370/503; 370/508
(58) Field of Classification Search .................. None
See application file for complete search history.

(56) References Cited

U.S. PATENT DOCUMENTS

| | | | | |
|---|---|---|---|---|
| 6,012,096 | A * | 1/2000 | Link et al. | 709/233 |
| 6,553,316 | B2 | 4/2003 | Bary et al. | |
| 6,697,870 | B1 * | 2/2004 | Cafarelli et al. | 709/233 |
| 6,769,029 | B1 | 7/2004 | Seki et al. | |
| 6,922,417 | B2 * | 7/2005 | Vanlint | 370/503 |
| 6,985,499 | B2 * | 1/2006 | Elliot | 370/503 |
| 7,209,795 | B2 * | 4/2007 | Sullivan et al. | 700/94 |
| 7,366,205 | B2 * | 4/2008 | Arnold et al. | 370/503 |
| 7,415,044 | B2 * | 8/2008 | Kallstenius | 370/516 |
| 2002/0186716 | A1 | 12/2002 | Eidson | |
| 2003/0048811 | A1 | 3/2003 | Robie et al. | |
| 2004/0105341 | A1 | 6/2004 | Chamberlain et al. | |

FOREIGN PATENT DOCUMENTS

| | | |
|---|---|---|
| EP | 0722233 A2 | 7/1996 |
| EP | 0986202 A2 | 3/2000 |
| EP | 1380918 A2 | 1/2004 |

OTHER PUBLICATIONS

EP Search Report on European Patent Application No. 05270063.0, dated Mar. 6, 2008.

* cited by examiner

*Primary Examiner*—Pankaj Kumar
*Assistant Examiner*—Marcus R Smith

(57) ABSTRACT

A method and apparatus for synchronizing a real time clock of a slave computer with a real time clock of a master computer. The method includes the steps of: calculating a first time drift value between the real time clock of the slave computer and the real time clock of the master computer, calculating a second time drift value between the real time clock of the slave computer and the real time clock of the master computer, calculating an average time drift value between the real time clock of the slave computer and the real time clock of the master computer using the first time drift value and the second time drift value, and adjusting the real time clock of the slave computer using the average time drift value.

23 Claims, 4 Drawing Sheets

HARDWARE-BASED NETWORK PACKET TIMESTAMPS: IMPROVED NETWORK CLOCK SYNCHRONIZATION

BACKGROUND OF THE INVENTION

1. Field of the Invention

One or more embodiments of the present invention generally relate to a network environment, and more particularly, to a method and apparatus for synchronizing the real time clocks of nodes within the network environment.

2. Description of the Related Art

A network environment, such as a distributed system, commonly includes an arrangement of nodes which are interconnected via a communication network. Each node of the network environment may include a local clock which maintains a local time for the node. It is commonly desirable to maintain a common sense of time in a network environment by synchronizing the local times maintained in the local clocks of its nodes.

One prior protocol for synchronizing the local clocks of a network environment is the Network Time Protocol (NTP). Typically, a node operating according to NTP periodically generates a packet containing a time value obtained from its local clock and transfers the packet via the communication network. Nodes running NTP usually gather these packets from the communication network and perform statistical analysis of the obtained time data and in response adjust the time values in their local clocks.

Each node may include a switch for channeling a packet from an input port to an output port that will forward the packet to its intended destination. The time the switch takes to transfer the packet from the input port to the output port may vary, depending on the packet and other factors. This variation in packet transfer time through the switch may be referred to as latency, which may cause jitter. Unfortunately, the jitter introduced by the switch often limits synchronization of the local clocks within the nodes.

Accordingly, a need exists in the art for a method and apparatus for synchronizing the local clocks of a network environment.

SUMMARY OF THE INVENTION

One or more embodiments of the present invention are generally directed to a method for synchronizing a real time clock of a slave computer with a real time clock of a master computer. The method includes the steps of: calculating a first time drift value between the real time clock of the slave computer and the real time clock of the master computer, calculating a second time drift value between the real time clock of the slave computer and the real time clock of the master computer, calculating an average time drift value between the real time clock of the slave computer and the real time clock of the master computer using the first time drift value and the second time drift value, and adjusting the real time clock of the slave computer using the average time drift value.

In one embodiment, calculating the first time drift value includes the steps of: receiving a first packet from the master computer, latching a first real time of the slave computer in response to receiving the first packet, receiving a second real time, wherein the second real time indicates the time at which the first packet is transmitted from the master computer, and subtracting the first real time from the second real time and adding to the result an amount of time for the first packet to travel from the master computer to the slave computer.

In another embodiment, calculating the second time drift value includes the steps of: sending a second packet to the master computer, latching a third real time in response to sending the second packet, receiving a fourth real time, wherein the fourth real time indicates the time at which the second packet is received by the master computer, and subtracting the third real time from the fourth real time and subtracting from the result an amount of time for the second packet to travel from the slave computer to the master computer.

One or more embodiments of the invention are also directed to a network environment, which includes: a master computer and a slave computer coupled to the master computer by a communication network. The slave computer includes: a real time clock, a memory containing a time drift measurement program, and a processor which, when executing the time drift measurement program, performs an operation comprising: calculating a first time drift value between the real time clock of the slave computer and a real time clock of the master computer, calculating a second time drift value between the real time clock of the slave computer and the real time clock of the master computer, calculating an average time drift value between the real time clock of the slave computer and the real time clock of the master computer using the first time drift value and the second time drift value, and adjusting the real time clock using the average time drift value.

In one embodiment, the slave computer further includes a sniffer for latching a real time of the slave computer in response to the slave computer sending or receiving a packet.

In another embodiment, the slave computer includes: an optical module, a transceiver communicably linked to the optical module, and a sniffer disposed between the optical module and the transceiver.

In yet another embodiment, the slave computer includes: a transceiver, a switch communicably linked to the transceiver, and a sniffer disposed between the transceiver and the switch.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
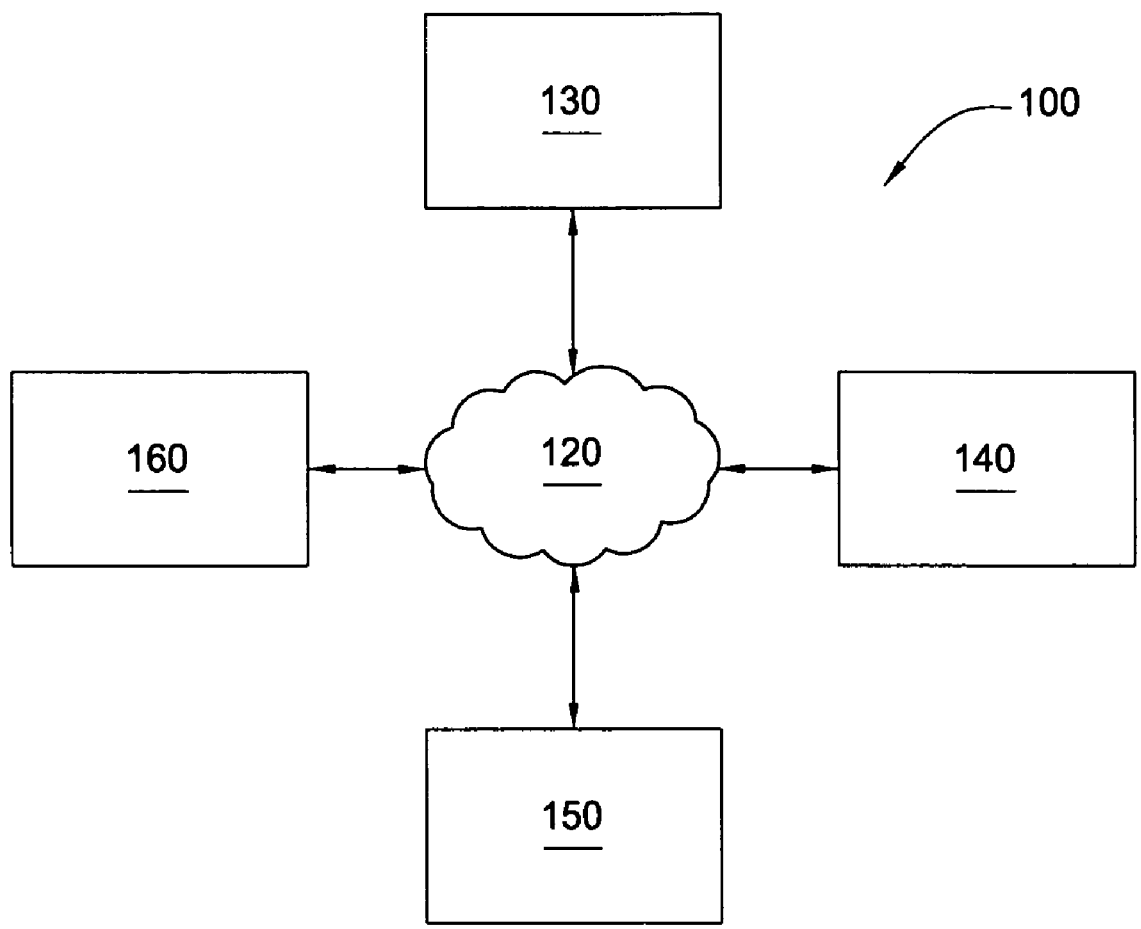
FIG. 1 illustrates a network environment in accordance with one or more embodiments of the present invention.

FIG. 1 illustrates a network environment 100 in accordance with one or more embodiments of the present invention. The network environment 100 includes node 130, node 140, node 150 and node 160, wherein each node may be a computer, server, wireless device, personal digital assistant, or any other device that may benefit from connection to the network environment 100. Although the network environment 100 illustrates only four nodes, one or more embodiments of the invention contemplate any number of nodes within the network environment 100. Each node 110 may communicate with one or more nodes through a communication network 120, which may be a conventional computer network, such as an Ethernet network or fiber channel network.

Figure 2:
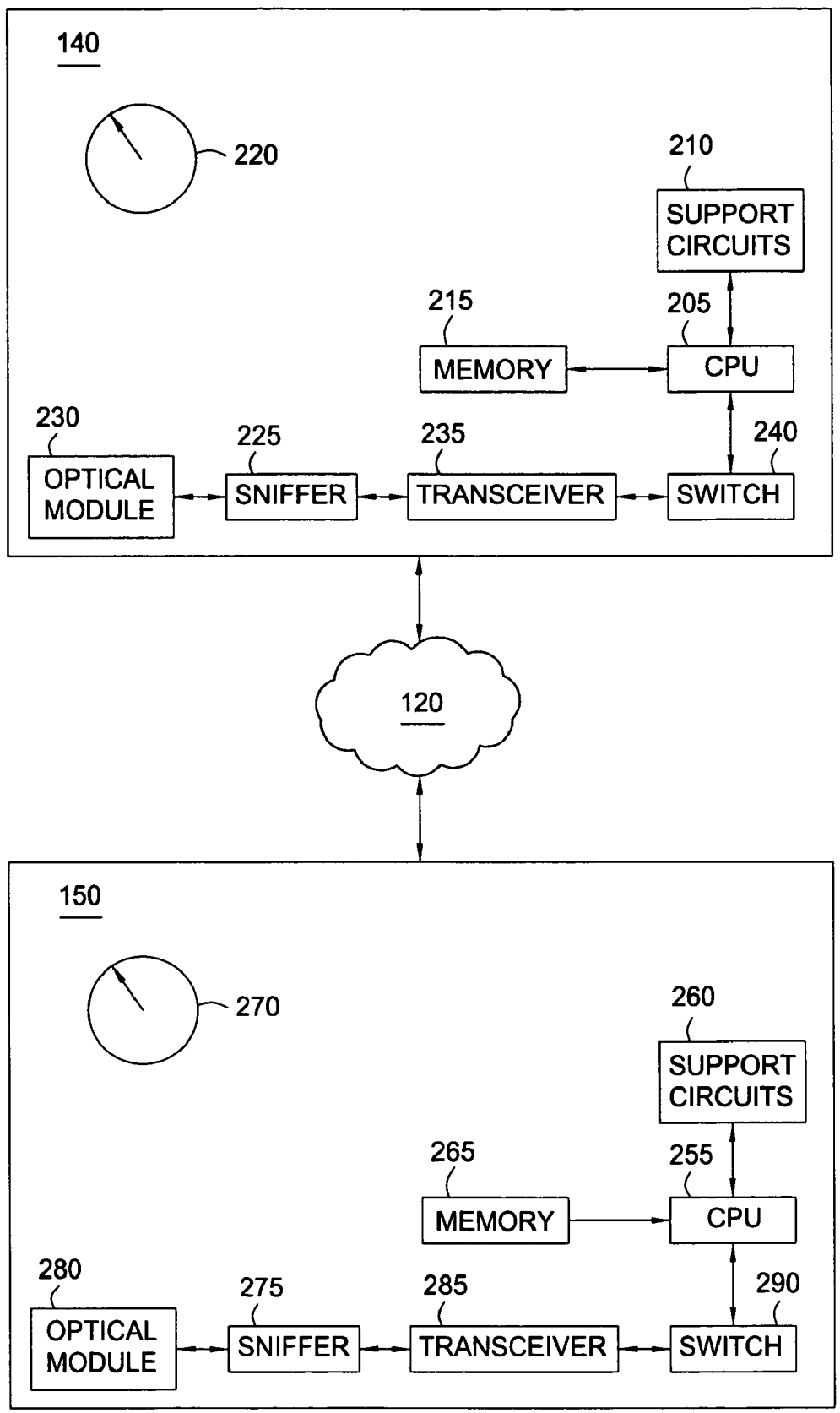
FIG. 2 illustrates two nodes within the network environment of FIG. 1 in more detail.

FIG. 2 illustrates node 140 and node 150 in more detail. Node 140 includes at least one central processing unit (CPU) 205, support circuits 210, and memory 215. CPU 205 may include one or more conventionally available microprocessors. Support circuits 210 may be well known circuits that include cache, power supplies, input/output interface circuitry and the like. Memory 215 may include random access memory, read only memory, removable disk memory, flash memory, and various combinations of these types of memory. Memory 215 may sometimes be referred to as main memory and may in part be used as cache memory. Memory 215 may store an operating system and various software applications. The operating system may be used to manage the operation of node 140. Examples of the operating system include Microsoft Windows, UNIX, Apple OS X, and the like.

Node 140 further includes a real time clock 220. Real time clocks are configured to keep track of time even when the computer is turned off. Real-time clocks typically run on a special battery that is not connected to the power supply of the computer. In contrast, clocks that are not real-time do not function when the computer is off.

Node 140 may further include an optical module 230 configured to convert optical signals received from communication network 120 to electrical signals, or convert electrical signals to be transmitted over communication network 120 to optical signals. Optical module 230 may be communicably linked to transceiver 235, such as an Ethernet transceiver BCM 5221 by Broadcom Corp. of Irvine, Calif. Transceiver 235 may be communicably linked to a switch 240, such as an Ethernet switch BCM 5327M by Broadcom Corp. of Irvine, Calif.

Optical module 230 may be communicably linked to transceiver 235 via a sniffer 225, which monitors data between optical module 230 and transceiver 235. More specifically, sniffer 225 is configured to latch the real time upon transmission or receipt of a time freeze packet, as will be described in detail in the following paragraphs with reference to FIG. 3. Sniffer 225 may be an FPGA (Field Programmable Gate Array) or an ASIC (Application Specific Integrated Circuit). In one embodiment, sniffer 225 may be positioned between transceiver 235 and switch 240 to monitor data between transceiver 235 and switch 240. Other embodiments of the invention contemplate other locations within node 140 in which sniffer 225 may be positioned.

Node 150 includes the same components as node 140. Accordingly, node 150 includes at least one central processing unit (CPU) 255, support circuits 260, and memory 265. Other details of CPU 255, support circuits 260 and memory 265 may be found with reference to CPU 205, support circuits 210 and memory 215 of node 140.

Node 150 also includes a real time clock 270. Other details of real time clock 270 may be found with reference to real time clock 220 of node 140.

Node 150 may further include an optical module 280 configured to convert optical signals received from communication network 120 to electrical signals, or convert electrical signals to be transmitted over communication network 120 to optical signals. Optical module 280 may be communicably linked to a transceiver 285, which may be communicably linked to a switch 290. Other details of optical module 280, transceiver 285 and switch 290 may be found with reference to optical module 230, transceiver 235 and switch 240.

As with the configuration of node 140, optical module 280 may be communicably linked to transceiver 285 via a sniffer 275, which monitors data between optical module 280 and transceiver 285. More specifically, sniffer 275 is configured to latch the real time upon transmission or receipt of a time freeze packet, as will be described in detail in the following paragraphs with reference to FIG. 3. In one embodiment, sniffer 275 may be positioned between transceiver 285 and switch 290 to monitor data between transceiver 285 and switch 290. Other details of sniffer 275 may be found with reference to sniffer 225 of node 140. Other embodiments of the invention contemplate other locations within node 150 in which sniffer 275 may be positioned.

Figure 3:
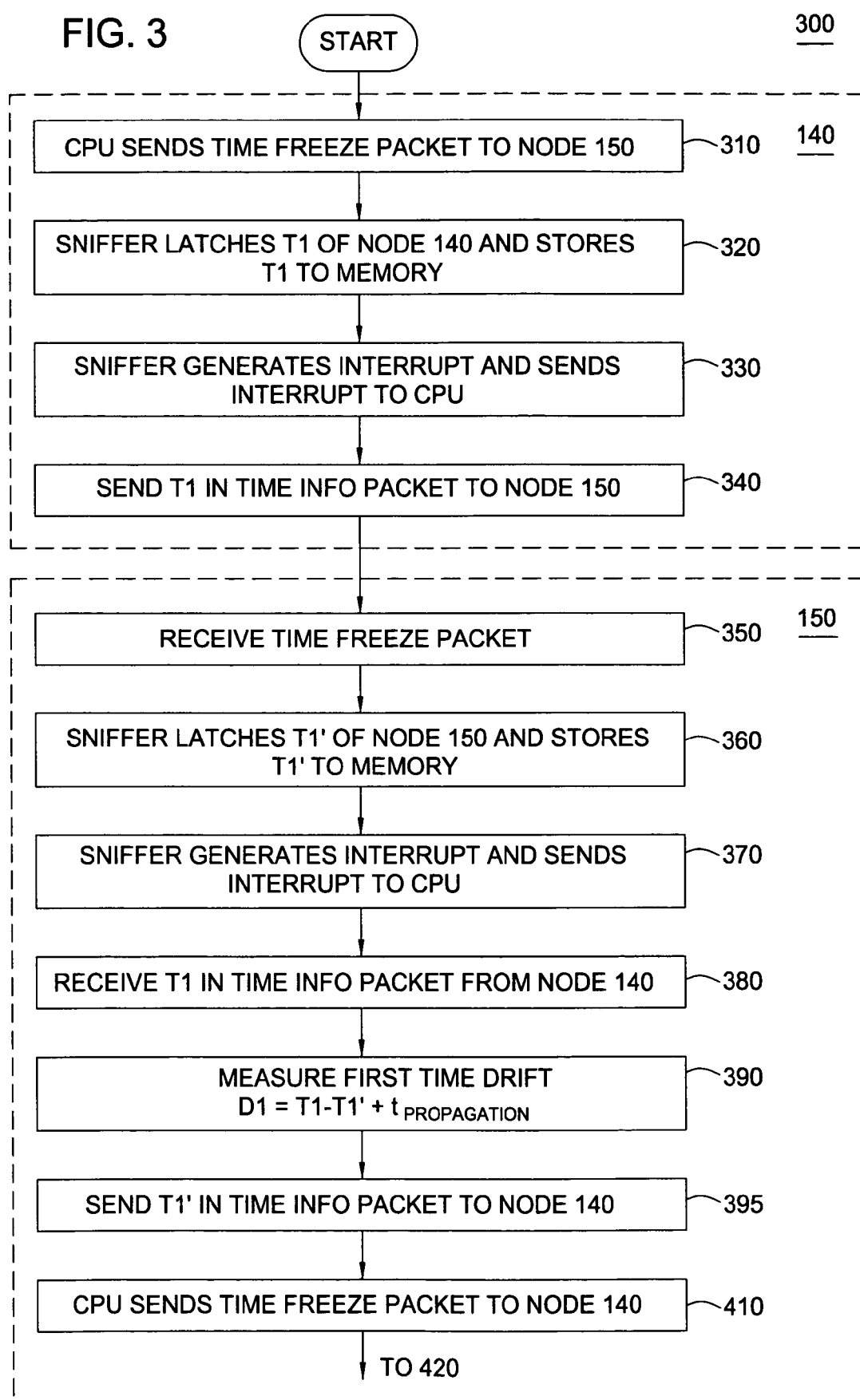
FIGS. 3 and 4 illustrate a flow diagram of a method for synchronizing a real time clock of a slave node with a real time clock of a master node in accordance with one or more embodiments of the invention.
Figure 4:
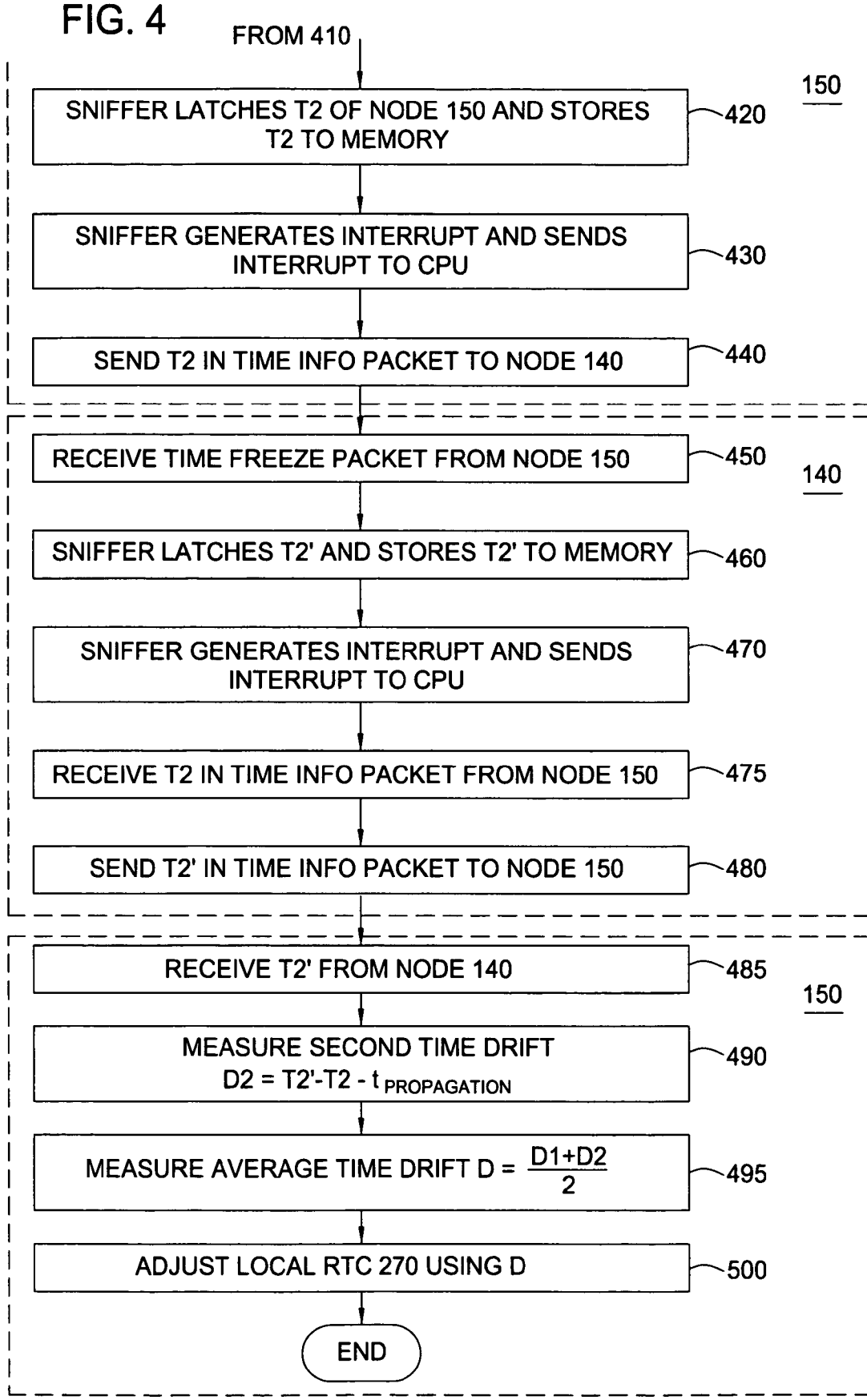

FIGS. 3 and 4 illustrate a flow diagram of a method 300 for synchronizing real time clock 270 of node 150 with real time clock 220 of node 140 in accordance with one or more embodiments of the invention. In this embodiment, node 140 acts as the master node, while node 150 acts as the slave node. At step 310, CPU 205 of node 140 sends a "time freeze" packet to node 150. In response to CPU 205 sending the time freeze packet to node 150, sniffer 225 of node 140 detects or latches the real time T1 of node 140 and stores T1 to memory 215 (step 320). In this manner, the time freeze packet causes sniffer 225 to "freeze" the time, i.e., the real time T1, of node 140 upon transmission of the time freeze packet to node 150. Sniffer 225 then generates an interrupt signal and sends the interrupt signal to CPU 205 (step 330).

In response to receiving the interrupt signal, CPU 205 retrieves T1 and stores it in a "time info" packet and sends the time info packet to node 150 (step 340). In this manner, node 150 is provided with the real time (i.e., T1) of node 140 at which the time freeze packet is transmitted.

At 350, node 150 receives the time freeze packet from node 140. The time between the transmission of the time freeze packet by node 140 and its receipt by node 150 may be referred to as propagation time, i.e., $t_{propagation}$. In response to receiving the time freeze packet, sniffer 275 latches the real time T1' of node 150 and stores T1' to memory 265 (step 360). In this manner, the time freeze packet is configured to cause sniffer 275 to latch the real time T1' upon receipt of the time freeze packet by node 150. Sniffer 275 then generates an interrupt signal and sends the interrupt signal to CPU 255 (step 370).

In response to receiving the interrupt signal, node 150 receives the time info packet containing real time T1 sent by node 140 (step 380). T1 may then be stored in memory 265. At step 390, the first time drift value D1 between real time clock 220 of node 140 and real time clock 270 of node 150 is measured according to:

$$D1 = T1 - T1' + t_{propagation} \qquad \text{Equation (1),}$$

where D1 represents the first time drift value, T1 represents the real time at which the time freeze packet is transmitted from node 140 to node 150, T1' represents the real time at which the time freeze packet is received by node 150, and $t_{propagation}$ represents the amount of time it takes for the time freeze packet to travel from node 140 to node 150. At step 395, CPU 255 retrieves T1' and stores it in a "time info" packet and sends the time info packet to node 140.

After a predetermined amount of time, CPU 255 of node 150 sends a time freeze packet to node 140 (step 410). The predetermined amount of time may be set by the user. In response to CPU 255 sending the time freeze packet to node 140, sniffer 275 latches the real time T2 of node 150 and stores T2 to memory 265 (step 420). The sniffer 275 then generates an interrupt signal and sends the interrupt signal to CPU 255 (step 430).

In response to receiving the interrupt signal, CPU 255 retrieves T2, stores it in a time info packet and sends the time info packet to node 140 (step 440).

At 450, node 140 receives the time freeze packet from node 150. As previously indicated, the time it takes for the time freeze packet to travel from node 150 to node 140 may be referred to as propagation time, i.e., $t_{propagation}$. In response to receiving the time freeze packet, sniffer 225 of node 140 latches its real time T2' and stores T2' to memory 215 (step 460). Sniffer 225 then generates an interrupt signal and sends the interrupt signal to CPU 205 (step 470).

At step 475, node 140 receives the time info packet containing real time T2 sent by node 150. T2 may then be stored in memory 215.

At 480, CPU 205 retrieves real time T2' from memory 215, stores it in a time info packet and sends the time info packet to node 150.

At step 485, node 150 receives the time info packet containing real time T2' sent by node 140. T2' may then be stored in memory 265. At step 490, the second time drift value D2 between real time clock 220 of node 140 and real time clock 270 of node 150 is measured according to:

$$D2 = T2' - T2 - t_{propagation} \quad \text{Equation (2),}$$

where D2 represents the second time drift value, T2 represents the real time at which the time freeze packet is transmitted from node 150 to node 140, T2' represents the time at which the time freeze packet is received by node 140, and $t_{propagation}$ represents the amount of time it takes for the time freeze packet to travel from node 150 to node 140.

At step 495, the average time drift value D between real time clock 220 of node 140 and real time clock 270 of node 150 may be measured according to:

$$D = (D1+D2)/2 = (T1 - T1' + t_{propagation} + T2' - T2 - t_{propagation})/2 \quad \text{(Equation 3).}$$

Assuming the amount of time ($t_{propagation}$) the time freeze packet takes to travel from node 150 to node 140 is substantially the same as the amount of time ($t_{propagation}$) the time freeze packet takes to travel from node 140 to node 150, the two propagation times would cancel each other out. As such, the average time drift value D may be abbreviated to:

$$D = (T1 - T1' + T2' - T2)/2 \quad \text{(Equation 4),}$$

where the values of T1, T1', T2 and T2' may be found in memory 265.

At step 500, node 150 adjusts its real time clock 270 using the average time drift value D calculated above. The real time clock 270 may be adjusted using a voltage controlled oscillator in combination with a digital to analog converter, or any other method commonly known by persons of ordinary skill in the art.

Method 300 may be repeated a number of times until the real time clock 270 of node 150 is synchronized with the real time clock 220 of node 140. The more method 300 is repeated, the more real time clock 270 converges to real time clock 220. In one embodiment, the process of method 300 may be reversed, i.e., method 300 begins with CPU 255 of node 150 sending a time freeze packet to node 140, rather than CPU 205 of node 140 sending a time freeze packet to node 150. Regardless of which node starts the process, the slave node, e.g., node 150, will be the node that calculates the average time drift D and adjusts its real time clock 270. In another embodiment, once the real time clock of a slave node has been synchronized with the real time clock of a master node, the slave node may serve as a master node to another slave node.

While the foregoing is directed to embodiments of the present invention, other and further embodiments of the invention may be devised without departing from the basic scope thereof, and the scope thereof is determined by the claims that follow.

What is claimed is:

1. A network environment, comprising:
   a master computer; and
   a slave computer coupled to the master computer by a communication network, wherein the slave computer comprises:
   a real time clock;
   a memory containing a time drift measurement program; and
   a processor which, when executing the time drift measurement program, performs an operation comprising:
   calculating a first time drift value between the real time clock of the slave computer and a real time clock of the master computer, wherein the first time drift value is based on a first real time indicating when the slave computer receives a first packet, a second real time indicating when the master computer transmits the first packet, and a first propagation time indicating an amount of time for the first packet to travel from the master computer to the slave computer;
   calculating a second time drift value between the real time clock of the slave computer and the real time clock of the master computer, wherein the second time drift value is based on a third real time indicating when the slave computer sends a second packet, a fourth real time indicating when the master computer receives the second packet, and a second propagation time indicating an amount of time for the second packet to travel from the slave computer to the master computer;
   calculating an average time drift value between the real time clock of the slave computer and the real time clock of the master computer using the first time drift value and the second time drift value; and
   adjusting the real time clock using the average time drift value.

2. The network environment of claim 1, wherein the slave computer further comprises a sniffer for latching a real time of the slave computer in response to the slave computer sending or receiving a packet.

3. The network environment of claim 2, wherein the packet is configured to cause the sniffer to latch the real time upon receipt or transmission of the packet.

4. The network environment of claim 1, wherein the master computer comprises a sniffer for latching a real time of the master computer in response to the master computer sending or receiving a packet.

5. The network environment of claim 4, wherein the packet is configured to cause the sniffer to latch the real time upon receipt or transmission of the packet.

6. The network environment of claim 1, wherein the slave computer further comprises:
   an optical module;
   a transceiver communicably linked to the optical module; and a sniffer disposed between the optical module and the transceiver.

7. The network environment of claim 6, wherein the transceiver is an Ethernet transceiver.

8. The network environment of claim 1, wherein the slave computer further comprises:
a transceiver;
a switch communicably linked to the transceiver; and
a sniffer disposed between the transceiver and the switch.

9. The network environment of claim 8, wherein the transceiver is an Ethernet transceiver.

10. The network environment of claim 8, wherein the switch is an Ethernet switch.

11. The network environment of claim 2, wherein the sniffer is one of a field programmable gate array and an application specific integrated circuit.

12. A method for synchronizing a real time clock of a slave computer with a real time clock of a master computer, comprising:
calculating a first time drift value between the real time clock of the slave computer and the real time clock of the master computer, wherein the first time drift value is based on a first real time indicating when the slave computer receives a first packet, a second real time indicating when the master computer transmits the first packet, and a first propagation time indicating an amount of time for the first packet to travel from the master computer to the slave computer;
calculating a second time drift value between the real time clock of the slave computer and the real time clock of the master computer;
calculating an average time drift value between the real time clock of the slave computer and the real time clock of the master computer using the first time drift value and the second time drift value; and
adjusting the real time clock of the slave computer using the average time drift value.

13. The method of claim 12, wherein calculating the first time drift value comprises:
receiving the first packet from the master computer;
latching the first real time of the slave computer in response to receiving the first packet; and
receiving the second real time, wherein the second real time indicates the time at which the first packet is transmitted from the master computer.

14. The method of claim 13, wherein the first time drift value is calculated using the first real time and the second real time.

15. The method of claim 13, wherein calculating the first time drift value further comprises subtracting the first real time from the second real time and adding to the result an amount of time for the first packet to travel from the master computer to the slave computer.

16. The method of claim 13, wherein the first real time is latched by a sniffer.

17. The method of claim 12, wherein calculating the second time drift value comprises:
sending a second packet to the master computer;
latching a third real time in response to sending the second packet; and
receiving a fourth real time, wherein the fourth real time indicates the time at which the second packet is received by the master computer.

18. The method of claim 17, wherein the second time drift value is calculated using the third real time and fourth real time.

19. The method of claim 17, wherein calculating the second time drift value further comprises subtracting the third real time from the fourth real time and subtracting from the result an amount of time for the second packet to travel from the slave computer to the master computer.

20. The method of claim 12, wherein calculating the average time drift value comprises computing an average value of the first time drift value and the second time drift value.

21. The method of claim 12, wherein calculating the first time drift value comprises:
sending the first packet to the master computer;
latching the first real time of the slave computer in response to sending the first packet;
receiving the second real time, wherein the second real time indicates the time at which the first packet is received by the master computer; and
subtracting the second real time from the first real time and adding to the result an amount of time for the first packet to travel from the slave computer to the master computer.

22. The method of claim 12, wherein calculating the second time drift value comprises:
receiving a second packet from the master computer;
latching a third real time in response to receiving the second packet;
receiving a fourth real time, wherein the fourth real time indicates the time at which the second packet is transmitted from the master computer; and
subtracting the fourth real time from the third real time and subtracting from the result an amount of time for the second packet to travel from the master computer to the slave computer.

23. A method for synchronizing a real time clock of a slave computer with a real time clock of a master computer, comprising:
calculating a first time drift value between the real time clock of the slave computer and the real time clock of the master computer;
calculating a second time drift value between the real time clock of the slave computer and the real time clock of the master computer, wherein the second time drift value is based on a first real time indicating when the slave computer sends a second packet, a second real time indicating when the master computer receives the second packet, and a propagation time indicating an amount of time for the second packet to travel from the slave computer to the master computer;
calculating an average time drift value between the real time clock of the slave computer and the real time clock of the master computer using the first time drift value and the second time drift value; and
adjusting the real time clock of the slave computer using the average time drift value.

* * * * *